United States Patent [19]
Berlin et al.

[11] 3,712,369
[45] Jan. 23, 1973

[54] METHOD FOR REMOVING HEAT FROM FLUIDIZED BED OF ROASTING FURNACE AND DEVICE FOR EFFECTING THE SAME

[75] Inventors: Zalman Leivikovich Berlin; Igor Vladimirovich Tsarev, both of Moscow; Anatoly Stepanovich Vasilchenko, Konstantinovka; Gennady Vasilievich Maslovsky, Belgorod; Anatoly Gavrilovich Serkov, Belgorod; Hviktor Yakovlevich Yakimovich, Belgorod; Evgeny Alexandrovich Ivanovsky, Moscow, all of U.S.S.R.

[73] Assignee: Gosudarstvenny nauchno-issledovatelsky institut tsvetnykh metallov, Moscow, U.S.S.R.

[22] Filed: Dec. 7, 1970

[21] Appl. No.: 95,790

[52] U.S. Cl. .................................... 165/1, 161/39
[51] Int. Cl. .................................... B60h 1/00
[58] Field of Search ..................... 165/1, 39, 140

[56] References Cited

UNITED STATES PATENTS 2,872,163  2/1959  Ranstead .................... 165/140

Primary Examiner—Charles Sukalo
Attorney—Holman & Stern

[57] ABSTRACT

A method for removing heat from a fluidized bed of a roasting furnace and a device for carrying this method into effect by means of steam-cooled tubular members, which provide for an increase in the heat absorption of these members through preliminary cooling of the steam fed thereinto up to saturation or wet state.

1 Claim, 1 Drawing Figure

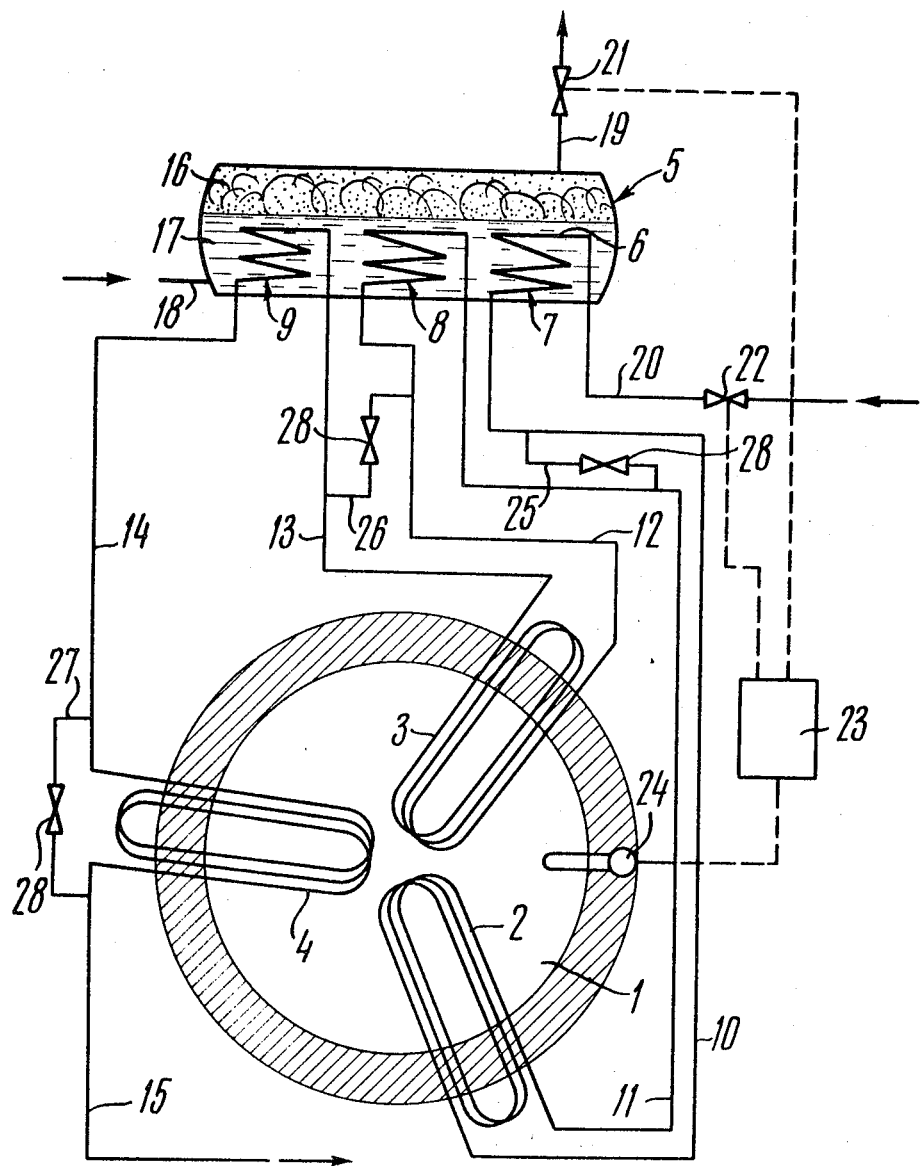

METHOD FOR REMOVING HEAT FROM FLUIDIZED BED OF ROASTING FURNACE AND DEVICE FOR EFFECTING THE SAME

The present invention relates to withdrawal of heat from a fluidized bed of a roasting furnace and can be used substantially in the process of roasting sulphide materials, particularly, sulphide copper, nickel, zinc and other concentrates.

It is well known that in the process of roasting sulphide concentrates, the exothermal reactions involved result in generation of excess heat, the amount of which is not constant and varies considerably under the action of either various occasional factors (change in blowing or in quantity of the charge being loaded) or operating conditions (change in the composition and moisture content of the change being loaded into the furnace.

The excess heat must be removed from the fluidized bed to maintain a prescribed temperature of the furnace determined by the chosen process conditions.

Various methods of controlling the temperature of the fluidized bed of a roasting furnace are used for this purpose. Some of them provide for control of the quantity of materials to be charged into the furnace, the other methods provide for supply of water into the above-bed space of the furnace or for changing the moisture content of the charge, for example, by adding water thereto to form a pulp.

It has been found in practice that the known methods are imperfect and adversely affect the technology of the process. On changing the quantity of the material being charged into the furnace, the relationship between the charge and the air fed into the furnace is disturbed and this leads to incomplete firing of the cinder or to an increase dust removal from the furnace. In case of feeding water into the furnace or when roasting the pulp, the concentration of steam and vapors of sulphuric acid in the exhaust gases is increased and this deteriorates the operation of the electrical filters for purification of the exhaust gases and subsequent sulphuric-acid conversion.

Hence, attempts have been made to improve the known methods of controlling the temperature in the fluidized bed through the use of cooled members (coiled pipes) which have been arranged in the fluidized bed and steam has been forced through these members.

This method allowed a prescribed temperature to be maintained within the furnace without affecting the technological parameters of the process. This method, however, does not provide for sufficiently wide range of control due to limited heat capacity of the tubular members and required a large amount of steam circulating through these tubular members.

The known device for carrying the above-said method into effect had a plurality of tubular members disposed within the fluid bed of the furnace and connected to a steam source, i.e., a waste-heat boiler of a roasting furnace, in which case the temperature fluctuations of the bed were measured by means of a thermocouple arranged within the fluidized bed. This device features a relatively small range of control due to a limited amount of steam fed from the source.

An object of the present invention is to eliminate the above-mentioned disadvantages.

The specific object of the invention is to provide an improved method and device to considerably increase the heat absorption of the cooled tubular members in a fluidized bed of a roasting furnace.

Given below is a description of the invention consisting in a method of removal of heat from a fluidized bed of a roasting furnace through the use of tubular members disposed within the said bed and fed with steam. According to the invention, the primary steam supplyed into the tubular members is preheated to a saturation or wet state, for which purpose it is forced through the pipes of a heat exchanger having a steam and water volumes in its interpipe space, in which the pressure of the secondary steam is changed, thus changing the temperature of the water to be evaporated occupying this space in inverse proportion to the required heat load of the tubular members in the fluidized bed.

The device for effecting the above-said method comprises tubular members arranged within the fluid bed of the roasting furnace which are cooled by steam, a temperature pickup to indicate the fluidized bed temperature being mounted at the same place. The improvement of the proposed device consists in that a tubular heat exchanger is provided having steam and water volumes, in which the tubes are combined into separate sections and all the tubular members in the fluidized bed are interconnected in series through corresponding sections, while the pickup is operatively connected to gates mounted on the lines for feeding primary and secondary steam, wherein the primary steam line is connected to the first section of the heat exchanger and the secondary steam line is connected to the steam volume of the heat exchanger.

To provide for selective disconnection of each tubular member in the fluid layer, these members are preferably interconnected through bypass lines.

The proposed invention is advantageous in that it provides for a higher heat absorption of the cooled members, ensures a highly-accurate temperature control and makes it possible to maintain a prescribed temperature within a wide range of fluctuations of the excess heat at a relatively small consumption of cooling steam and without any detrimental effect on process conditions.

As a result, the efficiency of the process of roasting (oxygen blowing) is increased, the servicing of the furnace is simplified and higher indices are obtained regarding to removal of sulphur and the concentration of sulphuric anhydride in the exhaust gases.

These and other advantages of the invention will be apparent from the following description of an embodiment of the invention, reference being made to the accompanying drawing which shows a schematic diagram of disposition of the tubular members in a roasting furnace and their series connection with the sections of a heat exchanger.

As shown in the drawing, in the fluidized bed of a roating furnace 1 there are located cooled tubular members 2, 3 and 4, through which primary steam is passed, which is a cooling agent.

To cool the primary steam fed into the tubular members 2, 3 and 4, a tubular water-steam heat exchanger 5 is provided, wherein tubes 6 are combined into separate sections 7, 8 and 9 according to the number of the tubular members in the fluid bed.

These tubular members 2, 3 and 4 are series interconnected through the corresponding sections 7, 8 and 9 of the heat exchanger 5, i.e., the member 2 has its input line 10 connected to the section 7 and its output line 11 connected to the section 8; the member 3 has its input line 12 connected to the section 8 and the output line 13 to the section 9; the member 4 has its input line 14 connected to the section 9, while its output line 15 is connected to an overheated steam consumer (not shown).

The intertube space of the heat exchanger 5 has a steam volume 16 and a water volume 17, in which case the water volume 17 of the heat exchanger is connected to a feed water supply line 18, the steam volume 16 is connected to a secondary steam line 19, and the first section 7 of the heat exchanger 5, as viewed along the steam movement, is connected to a primary steam line 20.

The primary and secondary steam lines 19 and 20 are equipped with controllable gates 21 and 22 which are controlled by an automatic regulator 23 receiving a command from a pickup 24 (thermocouple) measuring the temperature in the fluidized bed of the roasting furnace 1.

For selective disconnection of the tubular members 2, 3 and 4, for example, if one of them is burnt out, there are provided bypass lines 25, 26 and 27 with gates to interconnect these tubular members 2, 3 and 4.

The essence of the proposed method will be clear from the description of the operation of the above-proposed device. The primary steam from an exhaust-heat boiler (not shown), having, for example, a pressure of 40 atm and an overheating temperature of 300°–350°C, through the line 20 is fed into the heat exchanger 5, first into the tubes 6 of the section 7, where it is colled down to a dry saturated steam (250°C) or to a predetermined moisture content ($x = 0.6 - 0.7$), and the cooled primary steam is fed into the tubular member 2, therefrom the overheated steam (250°–50°C) is fed into the tubes 6 of the next section 8, in which it is cooled down again, etc. The overheated primary steam fed from the tubular member 4 is supplied to a consumer or to a reduction-cooling device (not shown).

The intermediate cooling of the primary steam to a saturated or wet steam makes it possible to increase the heat absorption of the members 2, 3 and 4 in a fluidized bed at a limited amount of steam withdrawn from the exhaust-heat boiler.

When the temperature of the fluid bed exceeds a predetermined value, the pickup 24 operates and the automatic regulator 23 first sends a signal for opening the gate 22 in the primary steam line 20. As a result, the consumption of the primary steam is increased, hence, there is increased the heat absorption of the members 2, 3 and 4.

Where it is impossible to increase the consumption of primary steam (the gate 22 is fully open), the automatic regulator 23 sends a command for opening the gate 21 in the secondary steam line, which gate is used for controlling the pressure within the intertube space of the heat exchanger 5. The pressure in the steam volume 16 of the heat exchanger 5 is reduced as compared with the pressure of the primary steam, hence, there is reduced the temperature of the water being evaporated within the water volume 17 of the heat exchanger 5, in which case a portion of the primary steam fed into the members 2, 3 and 4 will be converted into a condensate and the heat absorption of the members 2, 3 and 4 will be increased.

The maximum heat absorption of the members 2, 3 and 4 will be obtained at the outlet of dry saturated steam from the sections 7, 8 and 9. Further increase in the moisture of the primary steam will not increase of the heat capacity of the members 2, 3 and 4 in the fluidized bed.

When the temperature of the fluidized bed drops below a predetermined level, the automatic regulator 23 sends a command for closing the gate 21, therefore, the pressure within the intertube space of the heat exchanger 5 is increased accompanyed by an increase in the temperature of the water being evaporated in this heat exchanger, in which case the moisture content of the sted fed into the members 2, 3 and 4 is reduced.

In case the pressure in the heat exchanger 5 is equal to that of the primary steam, this steam is a dry saturated steam at the outlet of the sections 7, 8 and 9, and the automatic regulator 23 will control the gate 22 which reduces the amount of primary steam fed into the sections 7, 8 and 9 of the heat exchanger 5 to a minimum possible value determined by the permissible temperature of the metal of the members 2, 3 and 4 in the fluidized bed.

The heat capacity of the members 2, 3 and 4 will be reduced and the temperature of the fluidized bed will be increased.

The range of control of the heat capacity by the proposed method may be illustrated in the following example.

For a roasting furnace with a temperature 970°C in the fluidized bed and incorporating tubular members having a heat exchange surface of 6 m² and a cross section of 0.004 m³ the minimum heat absorption of these members (determined by the maximum permissible temperature of the metal of the tubular members of 670°C) may be calculated by the formula $$q_{min} = K_{min} \cdot t_{min}$$

where:
  $K_{min}$ is a minimum heat transfer coefficient;
  $t_{min}$ is a minimum temperature drop between the temperature $t_1$ in the fluidized bed and the medium temperature $t$ of the steam in the tubular members.
  $K_{min}$ is determined by the formula:

$$K_{min} = \frac{\alpha_1 \cdot \alpha_{2min}}{\alpha_1 + \alpha_{2min}} \frac{\text{kcal}}{\text{m.}^2 \text{ hour °C.}}$$

where:
  $\alpha_1$ is the coefficient of heat transfer from the fluidized bed to the tubular member;
  $\alpha_{2\,min}$ is the coefficient of heat transfer from the tubular member to the steam at a minimum consumption of steam;
  The thermal resistance of the metal of the tubular member and the contaminations may be neglected.
  At
  $\alpha_1 = 210$ kcal/m² . hour°C;
  $\alpha_{2\,min} = 65$ kcal/m² . hour°C and
  $t = 380$°C
  $K_{min} = (210 \cdot 650)/(210 + 650) = 154$ kcal/m² hour°C,
  $\Delta t_{min} = 970 - 380 = 590$°C.

In this case
$a_{min} = 154 \cdot 590 = 90000$ kcal/m²hour

The maximum heat absorption of the tubular members in the fluidized bed may be calculated by replacing the minimum values in the above-said formula with the maximum values.

Then at
$\alpha_1 = 210$ kcal/m²hour°C;
$= 10,000$ kcal/m² . hour°C and
$t = 250°C$ $$K_{max} = \frac{\alpha_1 \cdot \alpha_{2min}}{\alpha_1 + \alpha_{2min}} = \frac{210 \cdot 10000}{210 + 10000} \approx 200 \frac{\text{kcal}}{\text{m.}^2 \text{ hour °C.}}$$

$\Delta t \, max = 970 - 250 = 720°C$
$q_{max} = 200 \cdot 720 = 144000$ (kcal/m²hour°C)

Thus, an increase in the heat absorption will be equal to
$q_{max} - q_{min} = 54,000$ (kcal/m²hour) or
$(54000 \cdot 100)/9,000 = 60\%$

We claim:
1. A method of withdrawing heat from a fluidized bed of a roasting furnace by means of steam-cooled tubular members arranged within this bed comprising the steps of preliminary cooling of the primary steam fed into said tubular members to saturation or wet state by passing it through tubes of a heat exchanger whose intertube space has steam and water volumes and changing the secondary steam pressure within said intertube space so as to change the water temperature in the same space in inverse proportion to the required heat absorption of said tubular members in the fluidized bed.

* * * * *